United States Patent Office 3,333,702
Patented Aug. 1, 1967

3,333,702
FILTER PRESS
Lothar Müller, Gartenstrasse 10, Wesseling,
near Cologne, Germany
Filed Feb. 26, 1965, Ser. No. 435,465
Claims priority, application Germany, Feb. 26, 1964,
D 43,729
3 Claims. (Cl. 210—230)

The invention relates to a so-called plate-frame filter press having a plurality of filter plates and frames, and in which the plates and frames are automatically advanced or moved along a determined path upon structural means supporting them in order to separate the filter cake collected in such frames.

In this type of so-called plate-frame filter press, there are a large number of filter plates and frames movably or slidably arranged on a guide bar or rod. These filter elements are pressed together during the filtering process by hydraulic means, screws or gears. The filter plates, which in ordinary use carry a filter cloth or paper, are alternately spaced with the frames in which the solid material to be separated collects after the filtrate is removed.

The filter cake is removed from the hollow frames individually, either manually or with the aid of mechanical means.

German Patent No. 1,138,739, which disclosure is incorporated herein by reference, described an automatic plate moving means which aids in removal of the resulting filter cake. In the filter press described therein, the plates and frames are supported on both sides upon a rod or bar. Bolts, pins or other suitable means are placed in or connected to about the middle of the sides of these pieces which carry or support the plates on the rods or bars. The filter elements are thereby advanced or moved by carrier, catch or drive means which are fastened or connected to an endless drive chain or belt.

Similar automatic moving means or transport apparatus for filter presses are also known in which the upper ends of the plates and frames are movably connected, and by such connection the drive means acts on the upper ends.

A troublefree, automatic discharge of the filter cake from the filter press cannot be achieved with these means known heretofore. Such means have not provided absolute certainty that all of the filter cake will be discharged during the discharge procedure or stage without manual or other aid.

It is accordingly an object of the present invention to provide a plate-frame filter press providing automatic means in combination therewith which assures that all the filter cake will be removed.

The filter press of the invention comprises in combination coupling elements or means provided on each filter plate which successively hold each frame situated in front of each plate, upon opening of the filter press, at such a length until the frame reaches a determined angle and then releases it allowing the frame to return to a vertical position.

When the plates in the filter press according to the invention move laterally, that is, in the direction parallel to the supporting guide bars or rods, the coupling elements or means on upper ends of the plates in combination with the catch means on the bar or rod cause the frame to swing or rotate to such an angle that the filter cake adhering to the frame automatically loosens and is released. When the press is forced open, the filter cake falls out as the frame contributes its own weight to loosen the filter cake, for example, from the filter cloth or paper by the resulting downward motion of its upper part when the frame is moved to its angular position.

Separation of the cake from the frame is additionally supported or aided by slanting, beveling or tapering the inner surface, that is that facing the opening of the lower crosspiece of the frame toward the plate following the frame. That is, this surface is beveled or slanted so that the surface is substantially more vertical when the frame is in angular position. When the frame is in the angular position, the frame is slanted typically at an angle of about 100 to 115° and the iner surface of the lower crosspiece of the frame is slanted when in such position at an angle of about 55 to 70°, preferably 60°.

Additionally the inner edges of the side pieces of the frame and the inner edge of the upper crosspiece may curve conically together to form corners curved or shaped like part of the surface of a cone. These features likewise facilitate the filter cake in slipping out of the frame.

The invention is further described with reference to the accompanying drawings which illustrate an embodiment of the invention and wherein.

Figure 1:
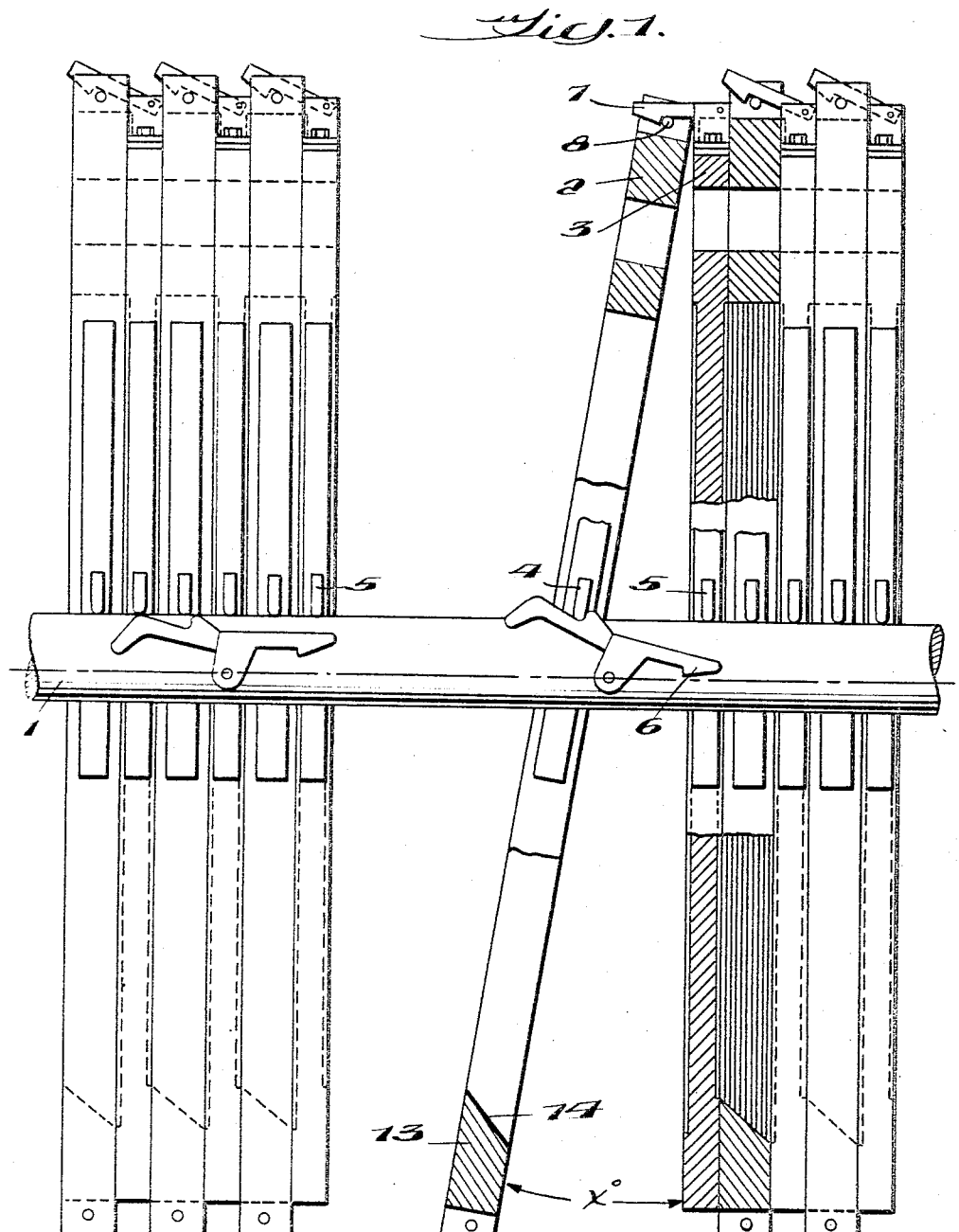
FIGURE 1 is a partial side view of a series of frames and filter plates supported on said rods or bars in a filter press according to the invention and illustrating one of the frames in angular position.

In the apparatus according to FIGURE 1 the rectangular plates and frames are moved laterally on the supporting bar or rod, one of the rods or bars 1 being shown in the drawing. Pins, bolts or supporting means 4 and 5 are attached or fixed to the side pieces of the hollow frames 2 or filter plates 3 by which the plates and frames are carried on the guide rod or bar 1 and the opposite side rod or bar not shown. The automatic transport or movement of the plates or frames to angular position is effected by coupling part or means 6, which, for example, may be according to the type set out in German Patent 1,138,739. In order to achieve the suitable inclination or angle X a hook or catch means 7 is rotatably attached to or mounted on the upper edge of each filter plate which catches or grips over the metal, e.g., iron rod or bar 8, running through the upper part of the frame and which is connected to the frame. When the frames are moved the upper ends of each pair of plates and frames are held together by the hook means 7 such that the frame swings around an upper turning point or axis and is thereby placed in an angular position. Since the movement of the hook means 7 is limited, the frame swings or rotates only up to a known or determined angle X. If this value is exceeded, then the rod 8 is released and accordingly the frame again returns to a perpendicular position and can be pressed on the next filter plate by the moving or transport means. A hollow frame may follow the next filter plate, which has a hook means connected thereto, during discharge of the press. As pressure is exerted on this plate the hook means rests on the preceding frame again and held in proper position by suitable inclination of the nose of the hook.

A ring or eyelet or similar means may be provided in place of rod 8. This procedure is repeated as often as the plates and frames are moved on the guide rod or bar 1. When all the frames have been emptied, the whole series of plates are again returned to the starting position and closed under pressure.

Figure 2:
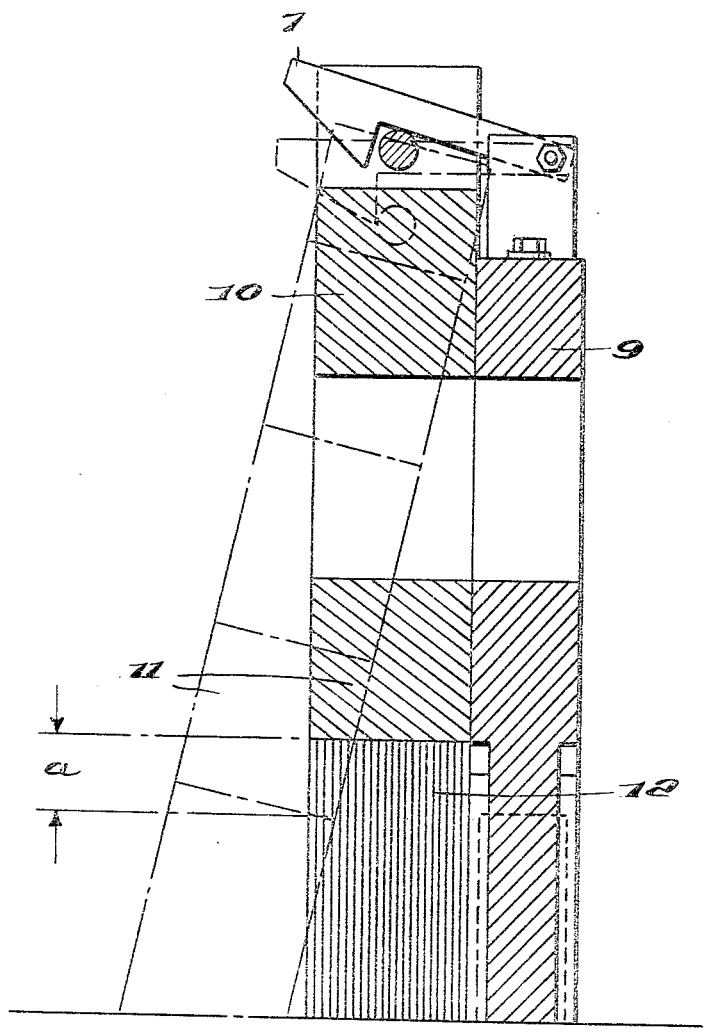
FIGURE 2 is a partial vertical section of one plate and one frame employed according to the invention illustrating a top connecting means.

The releasing process or position for the filter cake is illustrated in FIGURE 2. This figure illustrates a partial view of the upper portion 9 of filter plate 3 and upper portion 10 of frame 2 as shown in FIGURE 1. The frame is shown in angular position according to the procedure of the invention such that the crosspiece 11 of the frame is moved about a distance $a$. The frame hereby presses into the upper end of the filter cake 12 during its downward motion such that an automatic loosening of the filter cake from the filter plate is achieved.

Release of the cake from the frame is improved by beveling or slanting of inner surface 14 of bottom crosspiece 13 of the frame illustrated in FIGURE 1 which surface slants toward the filter plate 3.

Selection of a suitable filter cloth or paper is also advantageous in the separation process. For example, filters of certain artificial fiber are preferable. For suspensions that are especially difficult to filter, it is desirable to lay a so-called upper filter of silky fibers over the usual filter thus hindering adhesion of the cake to the filter cloth or paper.

With the apparatus according to the invention it is possible to fill the press using conventional means, for example, by contact with a solenoid valve which applies closing pressure electrohydraulically, and runs the medium to be filtered. Filling of the press may be opened and closed by a time relay. Wash water may be run in thereafter by opening another solenoid valve while regulating and stopping of the washing process may be effected by a time relay. After completely washing the press, the filtering procedure may again be started electrohydraulically whereupon the plate moving means is again set in motion in the manner set out above.

I claim:

1. A plate-frame filter press comprising in combination a series of alternately spaced pairs of plates and frames, rod means supporting said plates and frames, means for moving a frame away from a preceding plate of said pairs at a predetermined angle, coupling means mounted on the upper portion of each pair of plates and frames holding the upper portion of each pair of plates and frames rotatably together at said angle and adapted to release the frame at the point said angle is exceeded.

2. A plate-frame filter press as in claim 1 wherein said coupling means for said pair of plates and frames consists of a hook mounted on the upper portion of said plate and a hook connecting means on said frame onto which said hook grasps.

3. A plate-frame filter press as in claim 1 wherein said coupling means for said pair of plates and frames consists of a hook mounted on the upper portion of said plate and a hook connecting means on said frame onto which said hook grasps and wherein each of said frames has an opening therethrough and a bottom crosspiece, a top crosspiece and two side pieces connecting the top and bottom crosspieces, the inner surface of the bottom crosspiece facing the opening being sloped away from the opening and in the direction of the filter plate member of the pair.

References Cited

UNITED STATES PATENTS

| 699,052 | 4/1902 | Wilson | 210—227 |
| 3,232,435 | 2/1966 | Fismer | 210—230 |
| 3,289,844 | 12/1966 | Emele | 210—225 |

FOREIGN PATENTS

| 1,138,739 | 10/1962 | Germany. |
| 879,164 | 10/1961 | Great Britain. |

REUBEN FRIEDMAN, *Primary Examiner.*

C. DITLOW, *Assistant Examiner.*